United States Patent
Kazemian et al.

(10) Patent No.: US 10,152,893 B2
(45) Date of Patent: Dec. 11, 2018

(54) RETROFIT WIRELESS BLIND SPOT DETECTION SYSTEM

(71) Applicant: Kennesaw State University Research and Service Foundation, Inc., Kennesaw, GA (US)

(72) Inventors: Andrew Kazemian, Powder Springs, GA (US); Frederick Mba Amuna, Marietta, GA (US); Ilyas Kure, Marietta, GA (US); Deshawn Edwards, Stone Mountain, GA (US); Eli Franklin, Woodstock, GA (US)

(73) Assignee: KENNESAW STATE UNIVERSITY RESEARCH AND SERVICE FOUNDATION, INC., Kennesaw, GA (US)

( * ) Notice: Subject to any disclaimer, the term of this patent is extended or adjusted under 35 U.S.C. 154(b) by 0 days.

(21) Appl. No.: 15/606,412

(22) Filed: May 26, 2017

(65) Prior Publication Data

US 2017/0345313 A1  Nov. 30, 2017

Related U.S. Application Data

(60) Provisional application No. 62/341,794, filed on May 26, 2016.

(51) Int. Cl.
| | |
|---|---|
| *G08G 1/16* | (2006.01) |
| *G01S 13/56* | (2006.01) |
| *G01S 13/58* | (2006.01) |
| *G01S 13/93* | (2006.01) |

(52) U.S. Cl.
CPC ............. *G08G 1/167* (2013.01); *G01S 13/56* (2013.01); *G01S 13/58* (2013.01); *G01S 13/931* (2013.01); *G01S 2013/9332* (2013.01)

(58) Field of Classification Search
CPC ......... G08G 1/167; G01S 13/56; G01S 13/58; G01S 13/931
USPC ....................................................... 340/435
See application file for complete search history.

(56) References Cited

U.S. PATENT DOCUMENTS

| | | | |
|---|---|---|---|
| 5,929,786 A | 7/1999 | Schofield et al. | |
| 8,004,425 B2 | 8/2011 | Hoek et al. | |
| 9,041,552 B2 | 5/2015 | Yu | |
| 2009/0290369 A1* | 11/2009 | Schofield | B60C 23/00 362/494 |
| 2010/0073480 A1* | 3/2010 | Hoek | G01P 1/08 348/148 |
| 2010/0220406 A1* | 9/2010 | Cuddihy | B60R 1/025 359/843 |
| 2011/0010041 A1* | 1/2011 | Wagner | G01S 13/931 701/31.4 |
| 2015/0217696 A1 | 8/2015 | Yu | |
| 2017/0066375 A1* | 3/2017 | Kato | H04N 7/181 |
| 2017/0267176 A1* | 9/2017 | Hoyda | H04N 7/181 |

* cited by examiner

*Primary Examiner* — Jack K Wang
(74) *Attorney, Agent, or Firm* — Baker & Hostetler, LLP

(57) ABSTRACT

A method and system for detecting an object in the "blind-spot" of a moving vehicle. The system can be user-installed to retrofit a vehicle, e.g., one that lacks a more complex, factory-installed blind-spot detection system. The invention thus provides an inexpensive and simplified vehicle safety enhancement.

19 Claims, 8 Drawing Sheets

RETROFIT WIRELESS BLIND SPOT DETECTION SYSTEM

This application claims the benefit of U.S. Provisional Application No. 62/341,794, filed May 26, 2016, which is incorporated by reference herein in its entirety.

A method and system for enhancing vehicle safety, in particular, methods, systems, and computer products for detecting an object in an area surrounding a moving vehicle are disclosed. The moving vehicle may be a human controlled vehicle or it may be an unmanned vehicle or a self-driving vehicle.

A blind-spot detection system notifies a vehicle's driver and/or control system of the presence of other vehicles or objects located to the vehicle's sides and rear by providing warning alerts that can include visual, audible, vibrational, tactile, electrical signals, etc. Blind-spot monitors are an option that may do more than monitor the sides and rear of the vehicle; e.g., they may also alert drivers or vehicle control systems when traffic is approaching from the sides as the vehicle is backed out of a parking space.

Vehicle manufacturers have produced vehicles with factory-installed blind-spot detection systems. While such factory-installed blind-spot detection systems provide safety benefits to the drivers of such vehicles, a need exists for blind-spot detection systems with greater capabilities than currently available systems, e.g. increased field of view, increased range of detection, etc. There is also a need for a retrofit blind-spot detection system that can be economically purchased and readily installed in vehicles lacking a factory-installed blind-spot detection system.

One embodiment of the invention is a method of notifying a user and/or vehicle's control system of the presence of an object in an area proximate to a moving vehicle. The method includes identifying a first triggering event of a wireless motion detection sensor. A threshold measurement is established in response to the first triggering event based on a first status of the wireless detection sensor, the first status relating to a characteristic of the wireless detection sensor over a period of time. The method further includes identifying a second triggering event and, in response, establishing a detection measurement based on a second status of the wireless detection sensor. A detection identifier indicating the presence of an object in an area surrounding the vehicle is generated by comparing the detection measurement to the threshold measurement. An indication signal, based at least in part on the detection identifier is provided as an indicator to notify a user and/or vehicle's control system of the presence of the object in the area surrounding the vehicle.

Another embodiment of the invention is a method where the threshold measurement from the previous embodiment is changed or adjusted based on the detection measurement.

In any embodiment, the motion detection sensor may be powered by a battery and retrofit into the vehicle.

The object detected by the blind-spot detection system may be stationary relative to the vehicle, or it may be moving relative to the vehicle.

The motion detector may use the Doppler radar effect to measure the velocity of the object. The motion detector may have a field of view of 120 degrees or more, and may have a range of about eight feet.

In another embodiment, the indicator may include an audio circuit and/or a digital display circuit to notify the user and/or vehicle's control system of the presence of the object in the area surrounding the vehicle.

Another embodiment of the invention is a system that includes a wireless interface, a memory, and one or more processing circuits communicatively coupled to the memory. The one or more processing circuits are configured to identify a first triggering event of a wireless motion detection sensor. The processing circuit(s) are further configured to establish a threshold measurement in response to the first triggering event based on a first status of the wireless detection sensor, the first status relating to a characteristic of the wireless detection sensor over a period of time. The processing circuit(s) are further configured to identify a second triggering event and, in response, establish a detection measurement based on a second status of the wireless detection sensor. The processing circuit(s) then generate a detection identifier indicating the presence of an object in an area surrounding the vehicle by comparing the detection measurement to the threshold measurement. The processing circuit(s) are further configured to notify a user and/or vehicle's control system of the presence of the object in the area surrounding the vehicle by generating and providing an indication signal based, at least in part, on the detection identifier.

Another embodiment of the invention is a computer program product that includes computer program instructions stored on a non-transitory storage medium. The computer program instructions are configured, when executed by a processor of a computer, to identify a first triggering event of a wireless motion detection sensor. The computer program instructions further cause the computer processor to establish a threshold measurement in response to the first triggering event based on a first status of the wireless detection sensor, the first status relating to a characteristic of the wireless detection sensor over a period of time. The computer program instructions further cause the computer processor to identify a second triggering event and, in response, establish a detection measurement based on a second status of the wireless detection sensor. The computer program instructions then cause the computer processor to generate a detection identifier indicating the presence of an object in an area surrounding the vehicle by comparing the detection measurement to the threshold measurement. The computer program instructions further cause the computer processor to notify a user and/or vehicle's control system of the presence of the object in the area surrounding the vehicle by generating and providing an indication signal based, at least in part, on the detection identifier.

Figure 1:
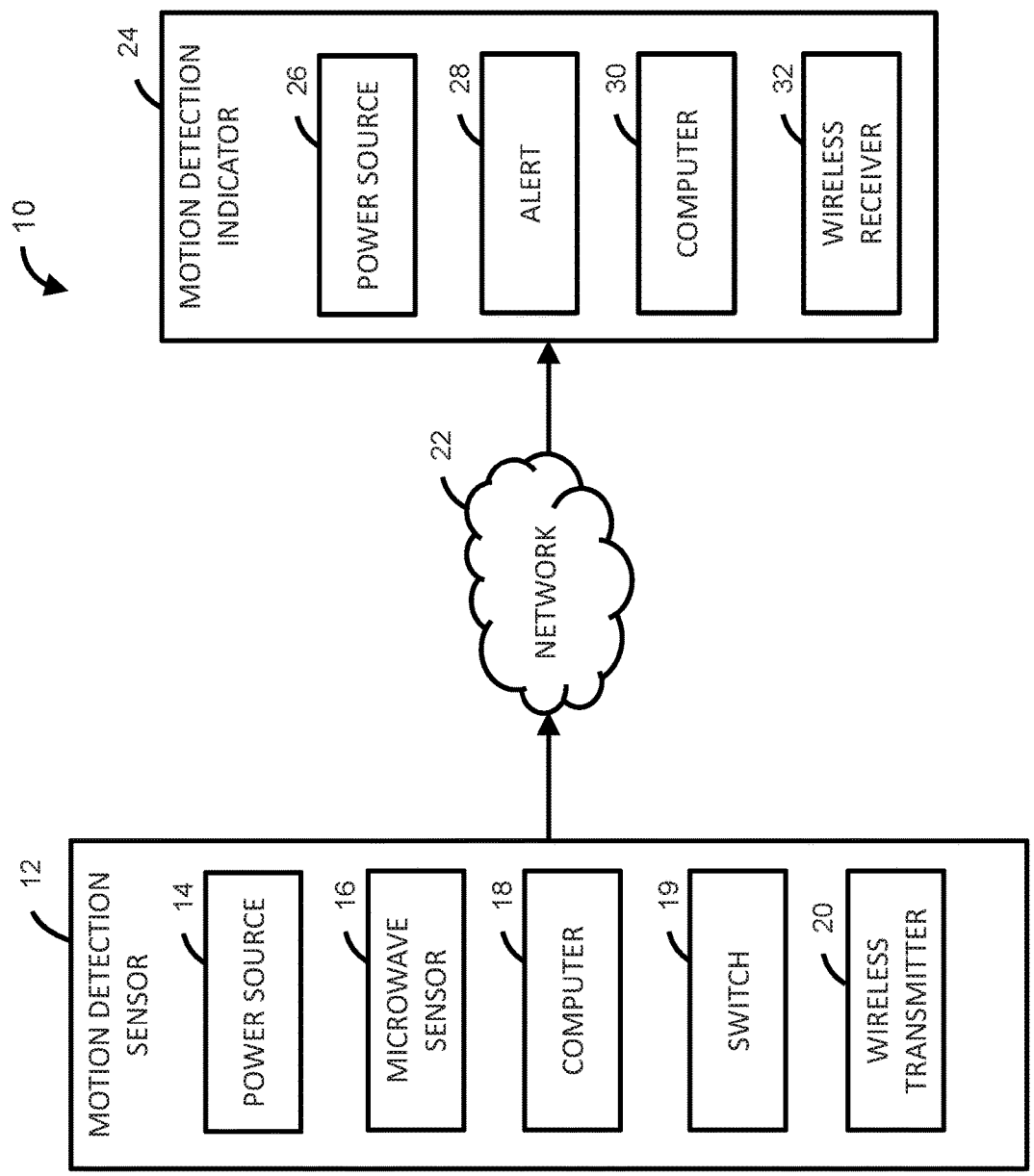
FIG. 1 shows one embodiment of an illustrative motion detection system.

A blind-spot is defined as the area around, surrounding, or proximate to a vehicle that is not clearly or overtly visible to the vehicle operator or operating system or network in the case of self-driving vehicles. In the alternative, a blind-spot may simply be the area around the vehicle. For example, a driverless vehicle may avoid nearby objects based on blind-spot detection, i.e. the detection of objects in the area around the vehicle.

Embodiments of the invention may enhance vehicle safety for each of drivers and passengers of all vehicles including non-motorized vehicles, e.g., cyclists, and also of pedestrians. The inventive method and system will reduce accidents and reduce insurance costs due to discounts provided for installed safety equipment. Vehicle operators may benefit from an added safety precaution generating confidence in, e.g., drivers in inclement weather conditions, inexperienced drivers becoming accustomed to road conditions and traffic flow, etc.

The inventive method and system is an economical and simplified blind-spot detection system, compared to complex systems requiring factory and/or dealer installation. The system components may be installed in vehicles without compromising the vehicle safety or condition, and may be easily and quickly retro-fit to a vehicle, e.g. self-installed in as short of a timeframe as fifteen minutes, thus eliminating complex installation processes and concomitantly decreasing installation costs and time. Another benefit is that components and/or embodiments of the invention are optimized to fit a plurality of different vehicles including, but not limited to, trucks, buses, coaches, recreational vehicles, trailers, boats, motor homes, oversized vehicles, motorcycles, etc. While some components or embodiments may require modification to the housing for the wireless detection sensors, the overall functionality of the sensors is identical for any vehicle, regardless of vehicle size.

In one embodiment, a sensor system is in wireless communication with an indicator system that provides a reliable alert upon detection of a vehicle in a blind-spot. Non-vehicle objects may be detected by the system if the non-vehicle object is moving with respect to the vehicle. For example, if the vehicle is moving, a non-moving object that is moving relative to the vehicle and thus, may be detected by the system. In the event that a vehicle is moving at the same speed and direction as an exemplary blind-spot detection system, i.e. a target vehicle persistently travelling in a blind-stop on a straight road, a persistent Doppler shift may not be detected by the system and, in an embodiment, a blind-spot detection alert may be maintained for an interval of time, e.g. three seconds. The time interval of the alert may therefore ensure that a vehicle detection is maintained until the target vehicle once again moves with respect to the sensor system. Accordingly, embodiments of the invention may maintain alerts for alternate time intervals, as deemed appropriate for a particular application or installation.

The inventive system may accurately identify vehicles within about eight feet of the detection sensor and/or a vehicle's blind-spot, and within a field of view of 120°. An optimal field of view suffices to monitor blind-spots for the majority of standard size vehicles, e.g. mini-compact, subcompact, compact, midsize, large, etc. The system may further compensate for a particular vehicle's blind-spot area by adjusting wireless detection sensor sensitivity and/or system thresholds, parameters, and/or settings. The inventive system may be applicable to all geographies and, in embodiments, may withstand temperatures from −20° F. to 120° F.

In an embodiment, the inventive method and system may be integrated into a navigation system and/or collision avoidance system for unmanned vehicles, including aerial, water, and land-based vehicles. The indication of an object detection/non-detection may be provided as an input to an unmanned vehicle's navigation system and/or collision avoidance system. By providing an energy efficient, lightweight, and cost-effective object detection system, application of the inventive method and system may enhance the unmanned vehicle's capability to avoid obstacles and/or other vehicles.

Features of an illustrative embodiment may include, but are not limited to, any combination of the following: accurate detection of vehicles in blind-spots up to eight feet away, reliable alert upon detection of a vehicle in a blind-spot, 15 minute installation of the system, six month rechargeable battery life, compatibility with 90% of presently-manufactured vehicles, low maintenance relative to other vehicle accessories, waterproof, temperature range of −20° F. to 120° F., field of view of 50° centered on a blind-spot, utilization of wireless and RF communication, lithium-ion batteries, microwave motion detector sensors, plastic components, LED alert, low electricity requirements, charging module for sensors and LED, suction cup for attachment to vehicles, and fast speed micro processing.

FIG. 1 shows one embodiment of an illustrative motion detection system 10, a vehicle-based sensor device that may be used to increase driver safety. The motion detection system 10 may include a wireless motion detection sensor 12. In an embodiment, the wireless motion detection sensor 12 may include a motion detection sensor housing 13, power source 14, microwave sensor 16, a computer 18, and a wireless transmitter 20. The wireless motion detection sensor 12 may communicate across a wireless network 22 with a wireless motion detection indicator 24. In an embodiment, the wireless motion detection indicator 24 may include a power source 26, an alert 28, a computer 30, and a wireless receiver 32. The motion detection system 10 may also include a wireless motion detection indicator 24. In an embodiment, the motion detection indicator 24 may include a motion detection indicator housing 25, power source 26, an alert 28, a computer 30, and a wireless receiver 32.

In one embodiment, the motion detection sensor 12 may include a Doppler radar sensor 16, e.g. a GH100 microwave sensor. By utilizing the Doppler effect, an exemplary Doppler radar sensor 16 may utilize microwave radar to detect relative object movements via oscillations in the Doppler sensor's high-low outputs. The detection sensor 12 may utilize a computer 14 for processing to accurately determine when a vehicle's blind-spot is being compromised. In an illustrative embodiment, a microcontroller 14 may be programmed with firmware to permit accurate readings using measured angles and distance thresholds. For communication between the wireless motion detection sensor 12 and wireless motion detection indicator 24, communication coding may be used to send a detection-identifying signal by a wireless transmitter 20 over a wireless network 22 when detection thresholds are exceeded.

In an illustrative embodiment, the motion detection sensor 12 may use a voltage regulator to maintain a regulated supply voltage, e.g. 5 volts. In an embodiment, code may be loaded to the computer or microcontroller 18 by in Circuit Serial Communication (ICSP) and stored into the memory of the computer 18. In an illustrative embodiment, computer 18 of the motion detection sensor 12 may include a digital input processor. The digital input processor may read the output of the Doppler radar sensor 16, which, in an illustrative embodiment, is a digital output of 0V for no motion and 5V to indicate motion. When motion is indicated, the computer 18 may make a corresponding decision to send a message via the wireless transmitter 20 over the network 22 to the motion detection indicator 24.

The computer 18 may use the wireless transmitter 20 to communicate an object detection by, e.g., 2.4 GHz Wi-Fi, to the wireless receiver 32 of the motion detection indicator 24 of an embodiment of the system 10. In an embodiment, each of the two or more sensors 12 and the indicator 24 may have unique wireless device IDs, inhibiting wireless interference with other systems in other cars.

In one embodiment, the circuit of the motion detection indicator 24 may include a power supply 26, e.g. 5V lithium ion battery. In an embodiment, the motion detection indicator 24 may include a computer 30, a visual or audio alert 28, e.g. one or more LEDs, and a wireless receiver 32. In one embodiment, the indicator's computer 30 may be configured to decide which LED of the alert 28 to turn on by using a unique wireless ID associated with a motion detection sensor 12 to determine whether the motion was detected by the right or left motion detection sensor 12.

An exemplary system 10 may consist of two separate motion detection sensors 12, the first motion detection sensor 12 for the left-hand side of a vehicle and the second motion detection sensor 12 for the right-hand side of the vehicle. Depending on the vehicle size and/or shape, alternative embodiments may include motion detection sensors 12 along the left and/or right-hand sides of the vehicle. In an exemplary embodiment, the motion detection sensors 12 may be contained within separate enclosures 13, one enclosure for each of the right and left side of the vehicle; the sensor enclosures 13 may be the same for both the left and the right side. Each motion detection sensor enclosure 13 may contain a motion detection sensor 16, as well as a computer 18, wireless transmitter 20, power source 14, and switch 15. In an illustrative embodiment, the power source 14 may consist of a battery, e.g. a rechargeable lithium polymer battery and charging module. In an embodiment, the battery life may be up to six months on a single charge and may charge to maximum functionality in three hours or less. In an alternative embodiment, the power source 14 may use a solar panel. Each motion detection sensor enclosure 13 may further contain a PCB board circuit for a computer 18. The motion detection enclosures 13 may be sized to fit the individual components contained within, including space for the charging module. In an exemplary embodiment, motion detection sensor enclosures 13 may be composed of three-dimensional-printed plastic, but alternative embodiments may be produced using plastic injection molding or other comparable methods. Openings may be incorporated into the motion detection sensor enclosures 13 for accurate sensing, as well as for accommodating and/or viewing LEDs. To facilitate vehicle retrofit installation, removal of motion detection sensors 12 for charging, and accurate sensor placement, the motion detection sensor enclosures may include a removable attachment apparatus, e.g. suction cups.

The motion detection sensors 12 may have markings on their respective enclosures 13 to indicate their range of detection, which is sufficiently broad to encompass the blind-spot area of a plurality of vehicles. In use, the motion detection sensors 12 may be positioned in the general range of about three to eight feet from the ground, and perpendicular to the surface of the windows on which they are mounted. An individual motion detection sensor 12 may be mounted in a single position, with an option of fine tuning the angle of installation about an x-y-z plane for taller vehicles. A user may install a motion detection sensor 12 by attaching the sensor to the rear side-window based on the angle of detection markings on the housing of the sensor. Because angle of the motion detection sensor 12 may be 120° or greater, a user may simply attach the sensor without concern for any particular placement of the sensor at a certain angle position. In embodiments, motion detection sensors 12 are placed on both sides of the inside back-seat windows facing the blind-spot. Embodiments may use microwave motion detection sensors 16 based on Doppler radar to detect a vehicle in the driver's blind-spot or within a certain distance, e.g. an eight foot radius.

In one embodiment, the wireless detection sensor 12 may be placed anywhere within the vehicle or attached to the vehicle exterior. In another embodiment, the entire system 10 may be located within the vehicle interior. An exemplary system 10 may be installed in an automobile by mounting the detection sensor 12 on the interior rear window. In another embodiment, the system may be waterproof. For example, the housing for the sensors 12 and indicator 24 may be made from a waterproof material to seal water from the internal components. In an embodiment, each sensor housing 13 may consist of separate parts which are joined with a water tight seal, e.g. a gasket between the housing parts. In yet another embodiment, the sensor housings 13 may be enclosed or covered by a waterproof barrier, e.g. a plastic dome encapsulating each sensor such that a watertight seal is formed between the dome and the body of the vehicle. The sensors 12 and indicator 24 may each include one access point that may be further sealed.

In an embodiment, motion detection indicator housing 25 of the system 10 may be located on the vehicle dashboard and any movement detected by the motion detection sensor 12 may be communicated by the network 22 to alert the corresponding LED on the display 28. For example, in an embodiment, an object sensed by the left motion detection sensor 12 may be communicated across the network 22 by the wireless transmitter 20 of the left motion detection sensor 12 to the wireless receiver 32 of the motion detection indicator 24. A corresponding left LED of the visual and/or audio alert 28 may then be turned on to alert the user and/or vehicle's control system of the left-hand side blind spot detection. Likewise, a detection by the right motion detection sensor 12 may be communicated across the network 22 by the wireless transmitter 20 of the right motion detection sensor 12 to the wireless receiver 32 of the motion detection indicator 24, which turns on the right LED of the visual and/or audio alert 28 to alert the user and/or vehicle's control system of the right-hand side blind spot detection.

Figure 3:
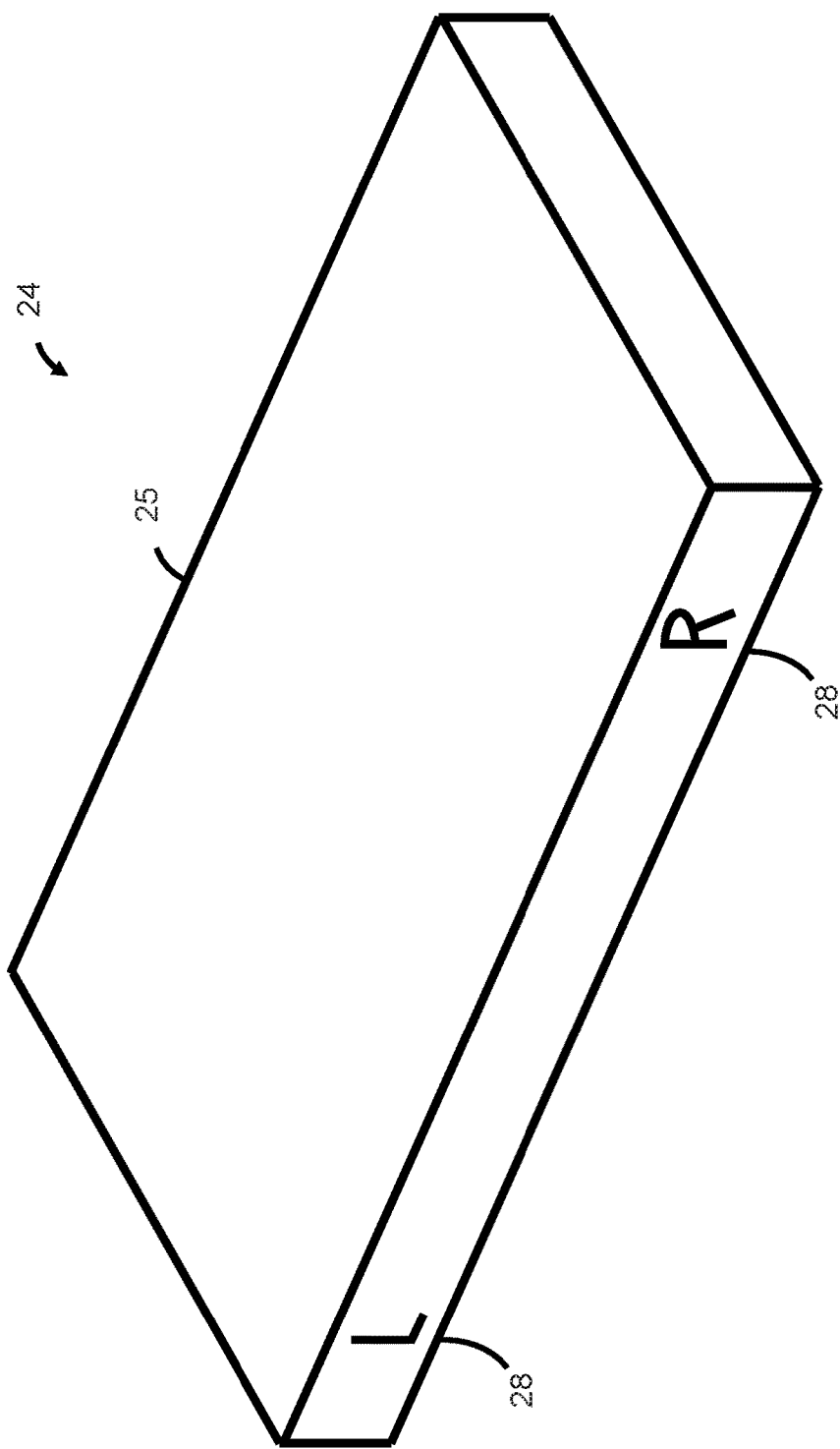
FIG. 3 shows one embodiment of an illustrative indicator of FIG. 1.

In an embodiment, a single alert indication unit 28 may be contained within a motion detection indicator housing 25 and may further protect the indicator's 24 components from environmental elements. FIG. 3 provides an illustration of an exemplary motion detection indicator 24, including motion detection indicator housing 25 and alert 28. The motion detection indicator housing 25 may enclose a computer 30, wireless receiver 32, power source 26, and an alert 28. In embodiments, the power source 26 may be a replaceable battery or a rechargeable battery and charging module. Alternatively, the power source 26 may use power from the vehicle, e.g. hard-wiring to the vehicle or interfacing with vehicle power plug. In an illustrative embodiment, the alert 28 consists of a plurality of LEDs to notify a user and/or vehicle's control system of an object detection. Alternative embodiments may provide an audio alert and/or a button-on LED indicator, which toggles an audio indication.

The computer 30 of the motion detection indicator 24 may be configured to react to initialization signals transmitted from the motion detection sensors 12. An object may enter the area surrounding a vehicle and, once the motion detection sensor's 12 threshold is exceeded, a wireless signal may be sent to the indicator 24 to alert a detection using the alert 28, e.g. illuminate the LED's placed in front of the vehicle operator.

The motion detection indicator housing 25 may be sized to fit the individual components contained within it. In an illustrative embodiment, it may include space for a charging module. Each motion detection indicator housing 25 may further contain a PCB board circuit for the computer 30. In an exemplary embodiment, a motion detection indicator housing 25 may be composed of 3D-printed plastic, but alternative embodiments may be produced using plastic injection molding or other comparable methods. Openings may be incorporated into the indicator enclosure for one or more alerts 28, such as viewable LEDs and/or to facilitate audio alert communication, e.g. speaker cut-outs or audio jack ports. The motion detection indicator housing 25 may include a removable attachment apparatus, e.g. suction cups, to facilitate vehicle retrofit installation, removal of the indicator 24 for charging, and optimal indicator 24 placement.

The motion detection indicator 24 may be placed or mounted on the dashboard directly in front of an operator to alert the operator without distraction. Alternatively, the motion detection indicator 24 may be placed anywhere on the dashboard that is convenient for the driver or user of the system. The alert 28 of the motion detection indicator 24 may consist of a series of LEDs, each LED communicating solely with a separate motion detection sensor 12. Separate LEDs may be designated for each of the right and left detection sensors 12 and for each unique wireless identification number associated with the motion detection sensors 12 in wireless communication with the motion detection indicator 24. In an exemplary embodiment, once the threshold of either motion detection sensor 12 is exceeded, the LED associated with the particular motion detection sensor 24 may activate and alert the operator.

In a retrofit embodiment, an individual may install the sensors 12 and transmitter 24 in a vehicle. In an illustrative vehicle installation, e.g., sedan, coupe, van, etc., the individual may place the sensors 12 on the interior rear window glass. Alternatively, the individual may place the sensors 12 on the outside mirrors of a vehicle, e.g. a truck. Angle markers may be indicated on the sensor housings 13 to assist the individual with accurate sensor 12 placement, facilitating accurate blind-spot detection. The individual may perform tests of the system to further facilitate accurate blind-spot detection.

Figure 2:
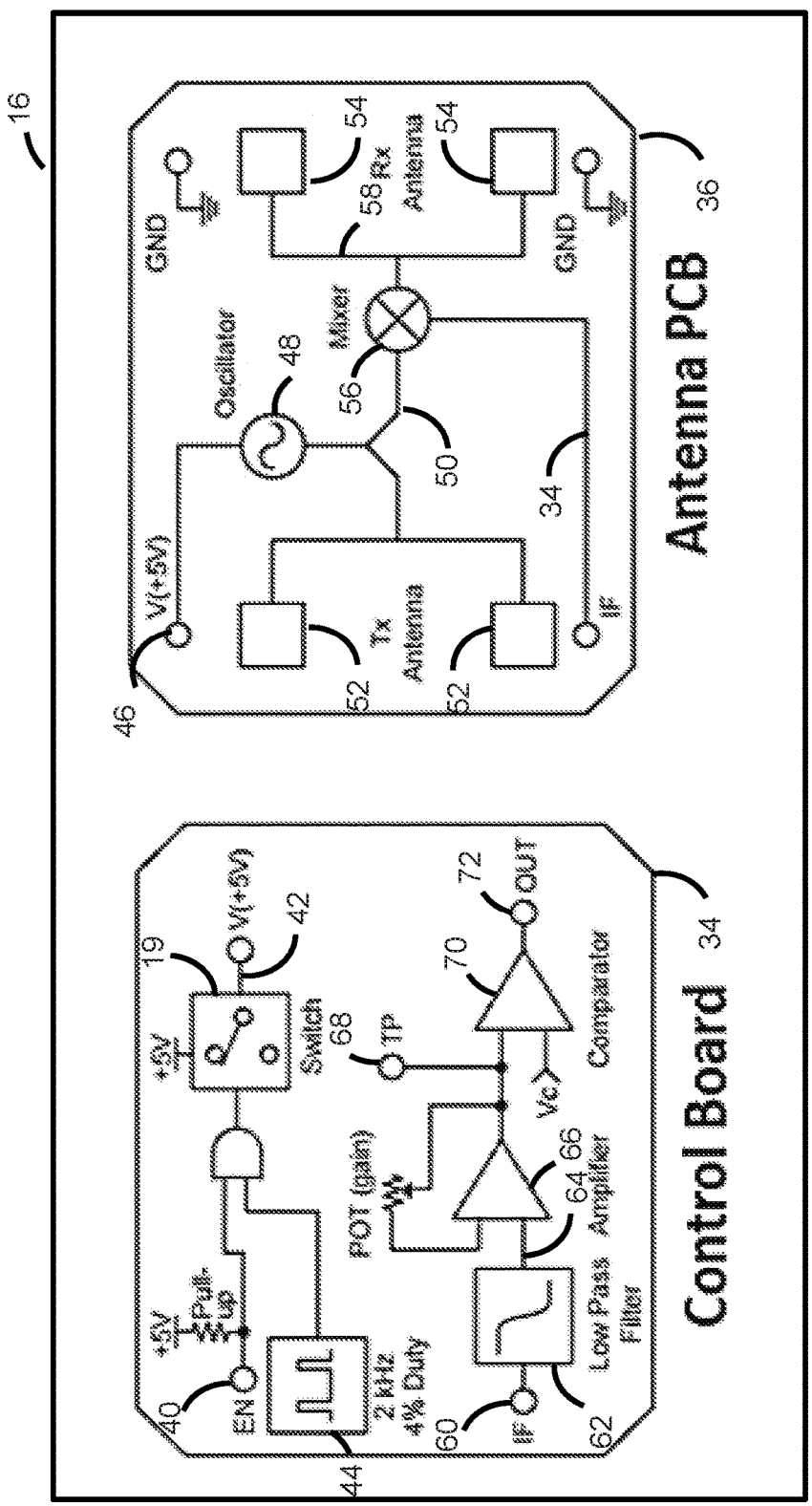
FIG. 2 shows one embodiment of an illustrative motion detection sensor of FIG. 1.

As FIG. 2 shows, a Doppler radar sensor 16 may include a control board 34 and an antenna printed circuit board 36. In an embodiment, an enable pin 40 on the control board 34 may enable the Doppler radar sensor 16 with a high signal 42 of 3.3 or 5 volts and may cycle the power of the Doppler radar sensor 16 at a generated frequency 44, e.g. 2 KHz with a 4% duty cycle.

The antenna printed circuit board 36 of the Doppler radar sensor 16 may be supplied by a supply voltage 46, e.g. a 5-volt supply, and an oscillator 48 may supply the Doppler radar sensor 16 with a generated frequency 50, e.g. 10.525 GHz. The generated frequency 50 may be directed by a radar transmission antenna 52 toward the vehicle's blind spot to detect an object's motion relative to the motion detection sensor 16.

A reflected frequency 56 may be received by a radar receiver antenna 54. A mixer 56 may determine the difference in the generated frequency 50 transmitted by the radar transmission antenna 52 and the reflected frequency 56, e.g. reflected wave from a detected object, received by the radar receiver antenna 54 to determine a detected object's speed, acceleration, motion, etc. The generated frequency signal 50 from the oscillator 48 may also be supplied to a mixer's 56 diode. The mixer 56 may output an intermediate frequency (IF) signal 60 containing both the sum and difference of the transmitted 50 and received 56 frequencies; the mixer's output 60 may also include harmonics. The IF signal 60 from the mixer 56 may then be passed to a low pass filter 62 and the low-pass filter may remove the unwanted higher frequency signals, such as the harmonics and the sum of the transmitted and received frequencies, leaving behind the difference signal 64. The differences signal 64 may then be passed through an amplifier 66 and the amplifier's gain may be adjusted by a potentiometer on the control board 34.

Op-amp 66 and filter 62 circuits for the motion detection sensor 16 may be modified and, in an embodiment, the motion detection sensor's 16 maximum range of detection may be adjusted with a potentiometer, with an illustrative maximum range of detection ranging from 2.4 to 9 meters. An illustrative embodiment may have a maximum range of detection of approximately 2.4 meters to detect a vehicle in an adjacent lane, the present and adjacent lanes having a width of approximately 3.7 meters. In an embodiment, the signal from the amplifier 68 may be passed through a comparator 70 which transforms the signal into a digital high/low output 72, signifying the presence of motion.

By analyzing the difference of the transmitted 50 and received frequencies 58, an illustrative embodiment may then determine the Doppler effect. In an embodiment, the difference signal 64 between the transmitted signal 50 and received signal 58 is related to the object's speed toward or away from the sensor by $$Fd = 2V\left(\frac{Ft}{c}\right)\cos\theta,$$

where Fd represents the difference frequency 64 from the mixer 56, v represents the velocity of the target, Ft is the transmitted frequency 50 (e.g. 10.525 GHz), and c is the speed of light (3*10e8 ms−1), and θ is the motion direction angle deviation from perpendicular to the antenna printed circuit board 36.

Figure 4A:
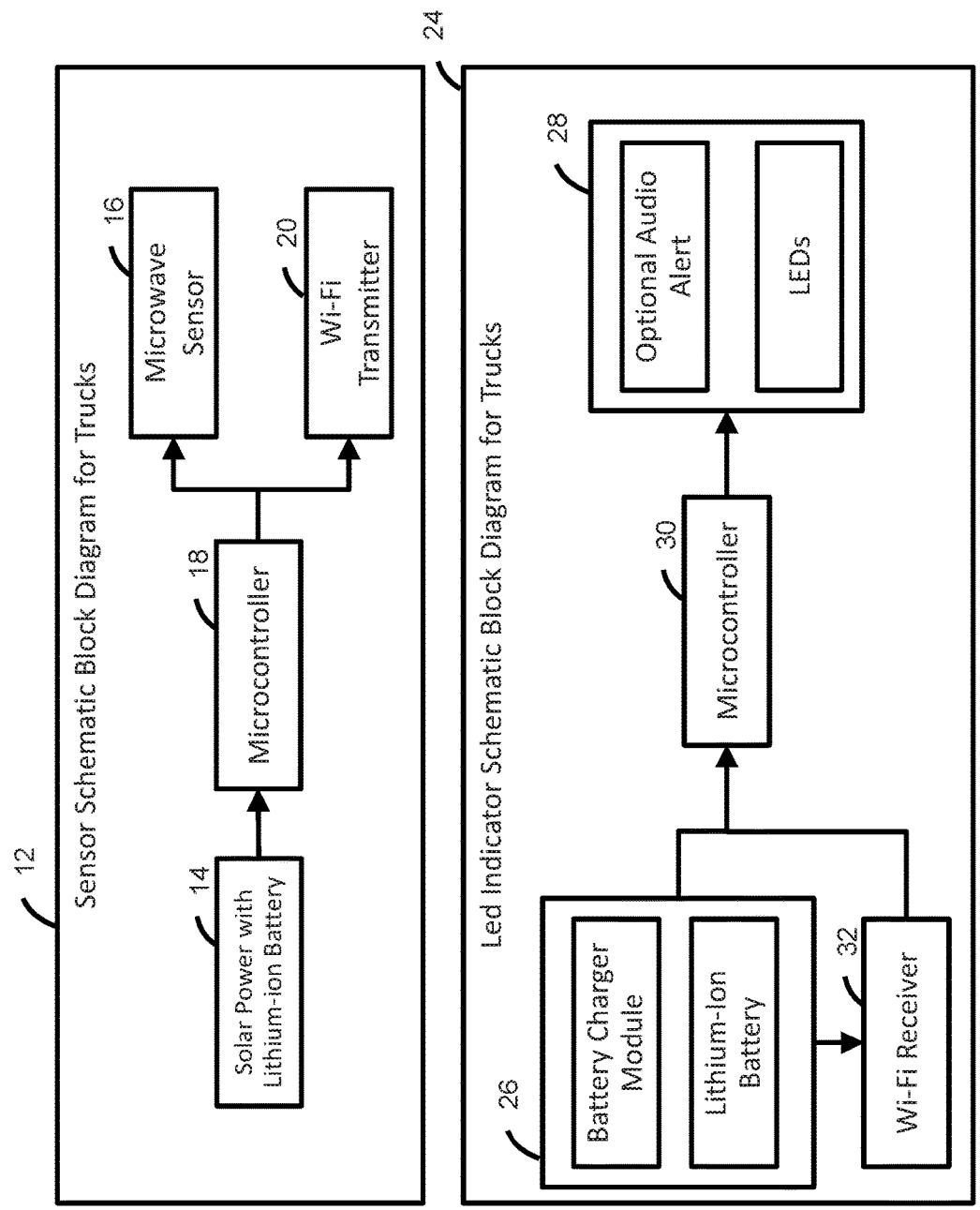
FIGS. 4A and 4B show embodiments of illustrative motion detection sensors and indicators for trucks and cars.

As FIG. 4A shows, an illustrative embodiment of the system 10 may be retrofit to trucks. The described embodiment is only presented by way of example and should not be construed as limiting the inventive concept to any particular physical configuration. In a retrofit application to trucks, the power source 14 of an illustrative motion detection sensor 12 may utilize solar power in combination with a lithium-ion battery, the computer 18 may be a microcontroller, and the wireless transmitter 20 may use Wi-Fi wireless protocol. The power source 26 of an illustrative motion detection indicator 24 may use a battery charger module and a rechargeable lithium-ion battery, the computer 30 may be a microcontroller, the wireless receiver 32 may utilize Wi-Fi wireless protocol, and the alert 28 may consist of LEDs and/or an optional audio alert.

Figure 4B:
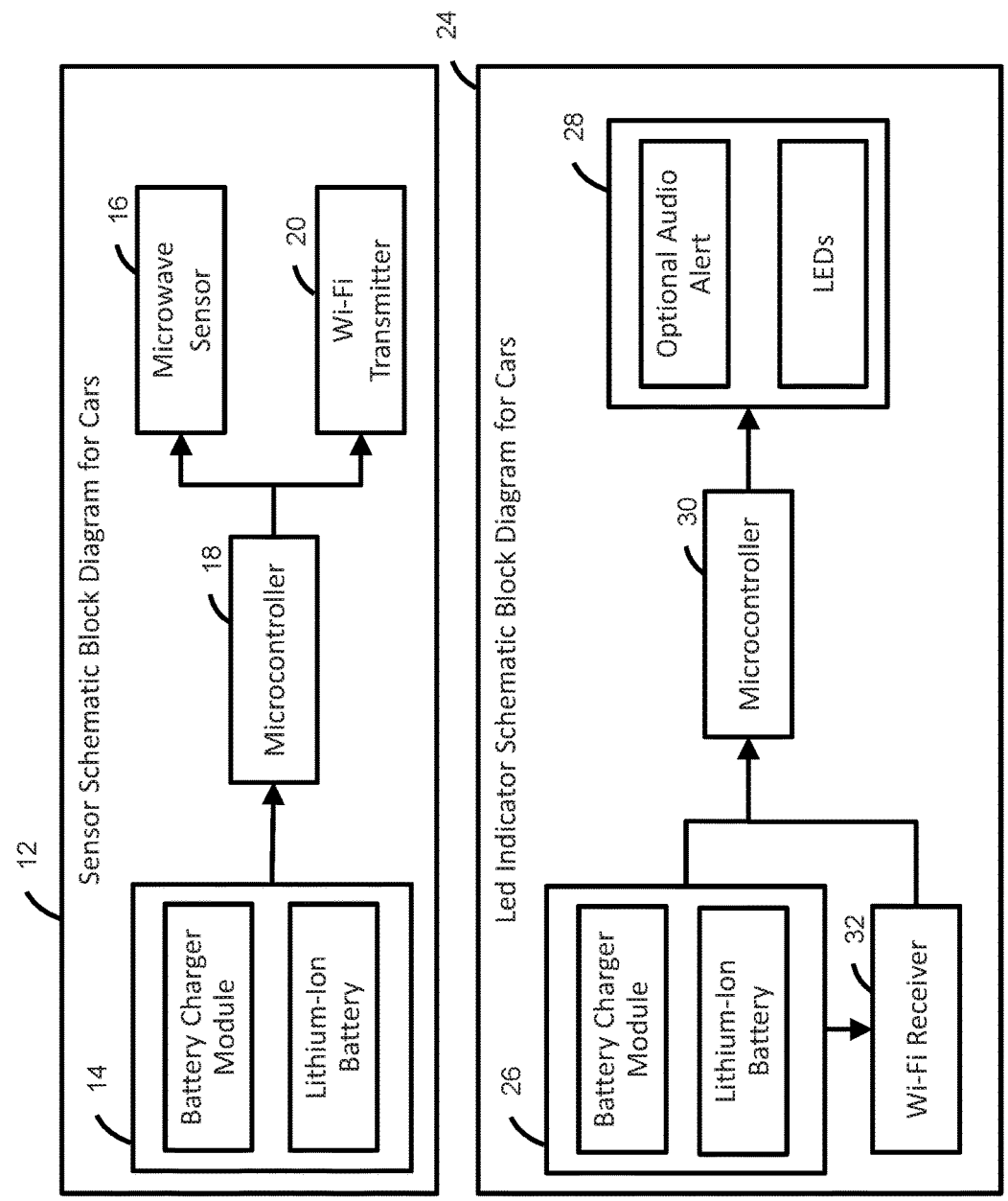

As FIG. 4B shows, an illustrative embodiment of the system 10 may be retrofit to cars. The described embodiment is only presented by way of example and should not be construed as limiting the inventive concept to any particular physical configuration. In a retrofit application to cars, the power source 14 of an illustrative motion detection sensor 12 may use a battery charger module and a rechargeable lithium-ion battery, the computer 18 may be a microcontroller, and the wireless transmitter 20 may utilize Wi-Fi wireless protocol. The power source 26 of an illustrative motion detection indicator 24 may utilize a battery charger module and a rechargeable lithium-ion battery, the computer 30 may be a microcontroller, the wireless receiver 32 may utilize Wi-Fi wireless protocol, and the alert 28 may consist of LEDs and/or an optional audio alert.

Figure 5:
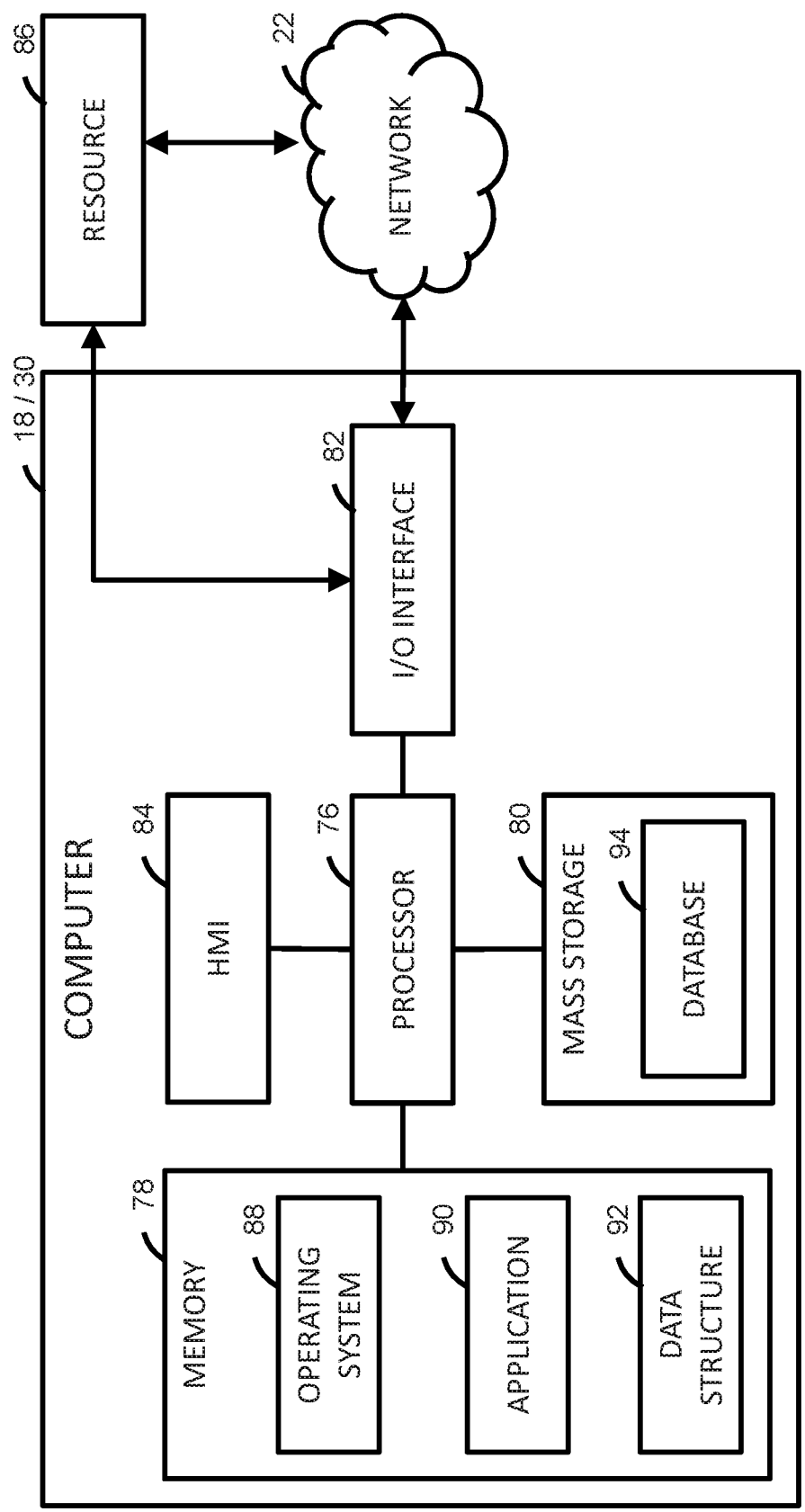
FIG. 5 shows a schematic view of an illustrative computer system of FIG. 1.

As FIG. 5 shows, the motion detection sensor 12 and indicator 24 may be implemented on one or more computer devices or systems, such as an exemplary such as exemplary computer system 74. The computer system 74 may include a processor 76, a memory 78, a mass storage memory device 80, an input/output (I/O) interface 82, and a Human Machine Interface (HMI) 84. The computer system 74 may also be operatively coupled to one or more external resources 86 via the network 22 or I/O interface 82. External resources may include, but are not limited to, servers, databases, mass storage devices, peripheral devices, cloud-based network services, or any other suitable computer resource that may be used by the computer system 74.

The processor 76 may include one or more devices selected from microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 78. The memory 78 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 80 may include data storage devices such as a hard drive, optical drive, tape drive, non-volatile solid state device, or any other device capable of storing information.

The processor 76 may operate under the control of an operating system 88 that resides in the memory 78. The operating system 88 may manage computer resources so that computer program code embodied as one or more computer software applications, such as an application 90 residing in memory 78, may have instructions executed by the processor 76. In an alternative embodiment, the processor 76 may execute the application 90 directly, in which case the operating system 88 may be omitted. One or more data structures 92 may also reside in memory 78, and may be used by the processor 76, operating system 88, or application 90 to store or manipulate data.

The I/O interface 82 may provide a machine interface that operatively couples the processor 76 to other devices and systems, such as the network 73 or the one or more external resources 86. The application 90 may thereby work cooperatively with the network 73 or the external resources 86 by communicating via the I/O interface 82 to provide the various features, functions, applications, processes, or modules comprising embodiments of the invention. The application 90 may also have program code that is executed by the one or more external resources 86, or otherwise rely on functions or signals provided by other system or network components external to the computer system 74. Indeed, given the nearly endless hardware and software configurations possible, persons having ordinary skill in the art will understand that embodiments of the invention may include applications that are located externally to the computer system 74, distributed among multiple computers or other external resources 86, or provided by computing resources (hardware and software) that are provided as a service over the network 73, such as a cloud computing service.

The HMI 84 may be operatively coupled to the processor 76 of computer system 74 in a known manner to allow a user to interact directly with the computer system 74. The HMI 84 may include video or alphanumeric displays, a touch screen, a speaker, and any other suitable audio and visual indicators capable of providing data to the user. The HMI 84 may also include input devices and controls such as an alphanumeric keyboard, a pointing device, keypads, push-buttons, control knobs, microphones, etc., capable of accepting commands or input from the user and transmitting the entered input to the processor 76.

A database 94 may reside on the mass storage memory device 80, and may be used to collect and organize data used by the various systems and modules described herein. The database 94 may include data and supporting data structures that store and organize the data. In particular, the database 94 may be arranged with any database organization or structure including, but not limited to, a relational database, a hierarchical database, a network database, or combinations thereof. A database management system in the form of a computer software application executing as instructions on the processor 76 may be used to access the information or data stored in records of the database 94 in response to a query, where a query may be dynamically determined and executed by the operating system 88, other applications 90, or one or more modules.

In general, the routines executed to implement the embodiments of the invention, whether implemented as part of an operating system or a specific application, component, program, object, module or sequence of instructions, or even a subset thereof, are referred to as "computer program code," or "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the inventive embodiments may be, e.g., assembly language or either source code or object code written in any combination of one or more programming languages.

The program code embodied in any of the applications/modules described herein is capable of being individually or collectively distributed as a program product in a variety of different forms. The program code may be distributed using a computer readable storage medium having computer readable program instructions thereon for causing a processor to carry out aspects of the inventive embodiments.

Computer readable storage media, which is inherently non-transitory, may include volatile and non-volatile, and removable and non-removable tangible media implemented in any method or technology for information storage, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

Figure 6:
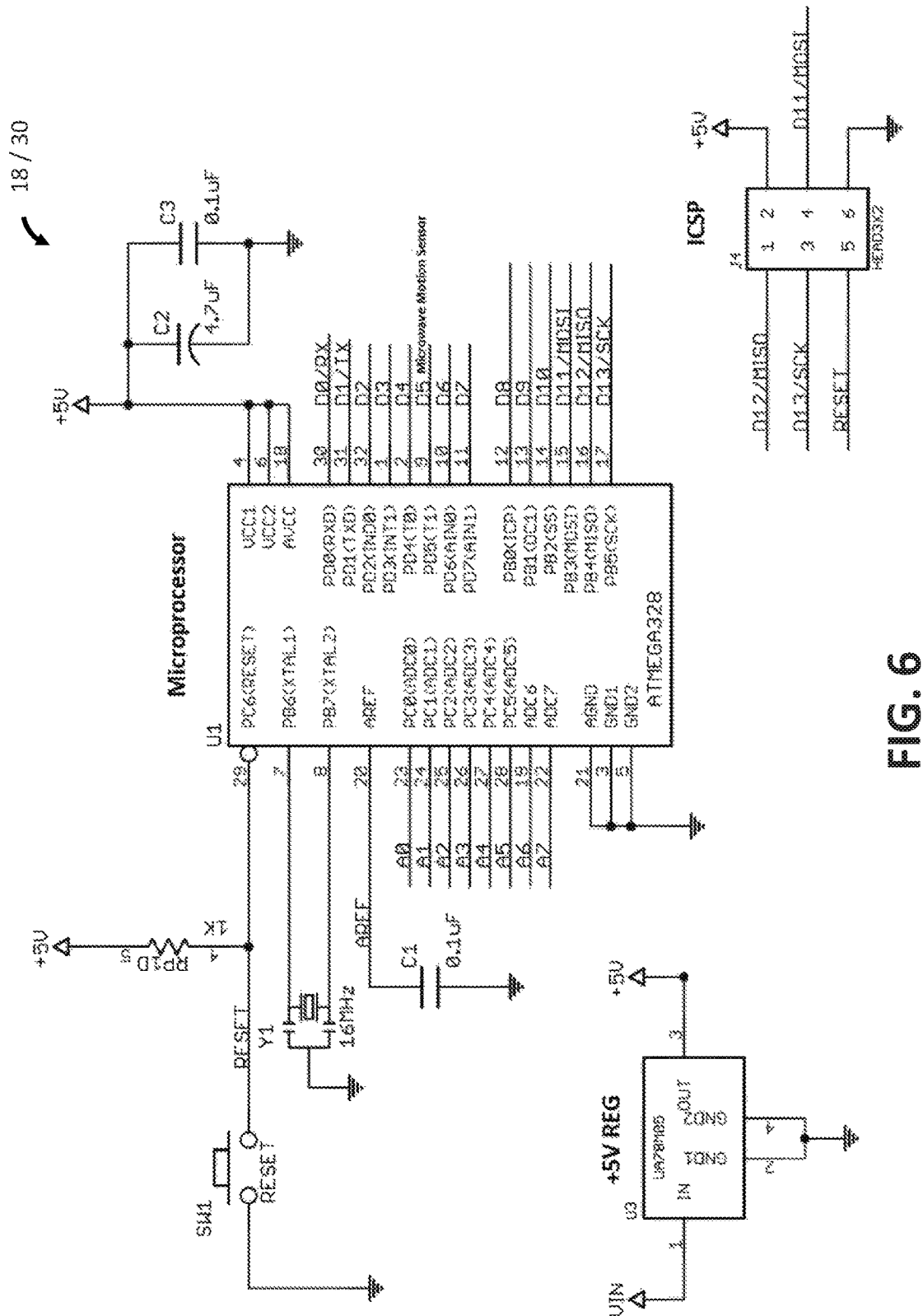
FIG. 6 shows one embodiment of an illustrative computer system of FIG. 1.

As FIG. 6 shows, the computer 18 of the motion detection sensor 12 and/or the computer 30 of the indicator 24 may utilize a microprocessor, e.g. ATmega328 microprocessor (Atmel, San Jose Calif.), \a positive voltage regulator, e.g. μA78M05 positive voltage regulator (Texas Instruments, Dallas Tex.) and a 3 by 2 ICSP header. The previously described embodiment is only presented by way of example and should not be construed as limiting the inventive concept to any particular physical configuration.

Figure 7:
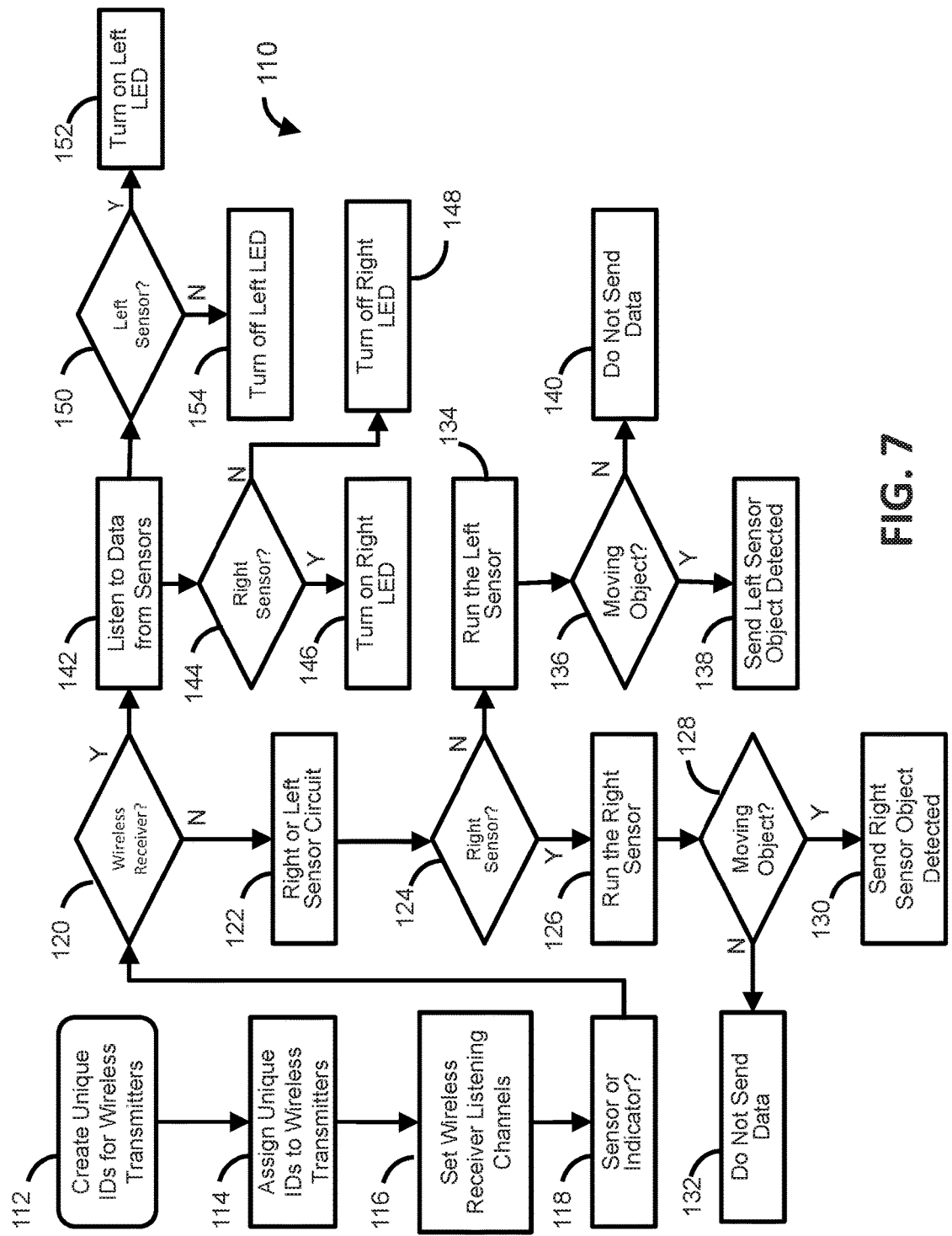
FIG. 7 is a flowchart showing a sequence of operations that may be performed by the system of FIG. 1 to notify a user and/or vehicle's control system of the presence of an object in the area surrounding a vehicle.

FIG. 7 shows a flowchart that illustrates a process 110 that may be performed by the blind spot detection system 10 of FIG. 1 to notify a user and/or vehicle's control system of the presence of an object in the area surrounding a vehicle, in accord with some embodiments of the invention. In step 112, the system 10 may begin performing initialization utilizing software loaded onto one or more of the system's computers or microcontrollers 18/30. Unique identification numbers or keys may be generated by each sensor's computer 18 when each sensor 12 first receives power. In step 114, each transmitter 20 may then store the unique identification number or key in persistent memory to act as a reference when communicating with the indicator 24. Thus, in step 116, the indicator 24 may differentiate between the sensors 12, as well as other nearby wireless systems or similar devices, based on the unique identification or keys of the sensors. For example, a first car with a first illustrative system may pass by a second car with a second illustrative system and each respective system may differentiate the wireless signals based on the unique identification or keys encoded into the wireless signals.

In illustrative embodiments, program code may be pre-loaded onto each of the respective sensors' 12 and indicator's 24 computers 18/30 based on its particular function. Alternatively, as in step 118, each computer 18/30 may be pre-loaded with the same program and the respective computers 18/30 may decide which functions to perform based on the hardware connected to the respective computer's 18/30 circuit. For example, in step 120, the computer 30 of an indicator 24 may identify the presence of a particular component, such as a wireless receiver 32, and determine to utilize the receiver functions of the program, e.g. wireless receiver and indicator functions.

Likewise, a computer 18 of a sensor 12 may determine to use the sensor function, e.g. object detection and wireless transmitter functions, of the program based on the presence or lack of a particular component or components, e.g. a radar sensor, and, as in step 122, make a determination of whether the sensor is a right or left sensor. In step 124, the sensor's computer 18 may determine whether the sensor is a left sensor or right sensor based on the circuit configuration, e.g. a voltage setting at a particular pin of the microcontroller, a dual in-line package switch (DIP) setting, etc.

The sensor's computer 18 may store a distance threshold for comparison to sensor distance determinations. In an illustrative embodiment, the sensor's computer 18 may include program instructions to determine a detected object's distance based on the input from the microwave radar sensor 16 and, when the distance threshold set for the microwave radar sensor 16 is breached, to transmit a wireless signal from the transmitter 20. In another embodiment, threshold measurements may be stored and utilized by the sensor computer 18 to facilitate detection of objects in a vehicle's blind spot. The threshold measurements may be defined based on system testing, analysis, or initialization. The threshold measurements may be pre-loaded onto each of the sensors' computers 18 or may be entered and/or modified during system installation or initialization.

As step 126 shows, having identified itself as a right sensor, the sensor's computer 18 may run the program instructions associated with a right sensor and, in step 128, determine whether there is a moving object using the Doppler radar sensor 16. As step 130 shows, the sensor 12 may then transmit that a right sensor object is detected, based on a high digital output 72 indicating a moving object. Alternatively, in step 132, the sensor 12 may not transmit any data when there has been no object detection.

Similarly, as step 134 shows, having identified itself as a left sensor, the sensor's computer 18 may run the program instructions associated with a left sensor and, in step 136, determine whether there is a moving object using the Doppler radar sensor 16. As step 138 shows, the sensor 12 may then transmit that a left sensor object is detected, based on a high digital output 72 indicating a moving object. Alternatively, in step 140, the sensor 12 may not transmit any data when there has been no object detection.

If, in step 120, the computer 30 of an indicator 24 identifies the presence of a particular component, such as a wireless receiver 32, the indicator 24 may remain in a wireless "listening" mode to conserve energy, i.e. enhance battery life, as shown in step 142. The indicator 24 may then activate upon receipt of a wireless signal from any one of the respective wireless transmitters of the sensors. The indicator 24 may further include program instructions to communicate a received wireless signal from the sensor 12, based on the received unique identification of the sensor, by enabling the corresponding alert 28, e.g. particular LED and/or by providing an audio alert. The indicator 24 may also be configured to maintain the alert for a period of time, e.g. leave the LED on for three seconds, in order to ensure the alert 28 is seen and/or heard.

In step 144, the indicator 24 identifies if it has received communications from a right sensor 12. In an illustrative embodiment, the right and/or left sensors 12 may transmit unique signals upon detection so the indicator 24 can identify whether the a received signal has been transmitted from a right or left sensor. For example, a right sensor may transmit a string message of "RIGHTON" for a detection and/or a left sensor may transmit a string message of "LEFTON". As shown in step 146, the indicator 24 may alert a right sensor detection by activating the corresponding alert 28, for example, turning on the right LED. Alternatively, the indicator 24 may not activate a right sensor alert 28 if there is no communication from the right sensor 24, as shown in step 148.

In step 150, the indicator 24 may identify if it has received communications from a left sensor 12. As shown in step 152, the indicator 24 may alert a left sensor detection by activating the corresponding alert 28, for example, turning on the left LED. Alternatively, the indicator 24 may not activate a left sensor alert 28 if there is no communication from the left sensor 24, as shown in step 154.

In alternative embodiments, the functions and/or acts specified in the flowcharts, sequence diagrams, and/or block diagrams may be re-ordered, processed serially, and/or processed concurrently without departing from the scope of the invention. Any flowcharts, sequence diagrams, and/or block diagrams may include greater or fewer blocks than those illustrated, consistent with inventive embodiments.

The embodiments shown and described in the specification are only specific embodiments of inventors who are skilled in the art and are not limiting in any way. Therefore, various changes, modifications, or alterations to those embodiments may be made without departing from the spirit of the invention in the scope of the following claims. The references cited are expressly incorporated by reference herein in their entirety.

What is claimed is:

1. A method comprising
identifying, via a wireless motion detection sensor retrofit to a vehicle, a first triggering event of the wireless motion detection sensor;
establishing, in response to the first triggering event of the wireless motion detection sensor, a threshold measurement, where the threshold measurement is based on a first status of the wireless detection sensor and the first status of the wireless detection sensor relates to a characteristic of the wireless detection sensor over a period of time;
establishing, in response to a second triggering event of the wireless motion detection sensor, a detection measurement, where the detection measurement is based on a second status of the wireless detection sensor, wherein one or more of establishing the threshold measurement or establishing the detection measurement comprises filtering a measurement of the wireless motion detection sensor for false trigger events based at least on at least a speed differential of the vehicle and a false trigger object associated with the false trigger event;
generating, by comparing the detection measurement to the threshold measurement, a detection identifier for indicating presence of a trigger object in an area surrounding a vehicle; and
transmitting, using a wireless transmission protocol and to a receiver device spaced from the wireless motion detection sensor, an indication signal, based at least in part on the detection identifier, wherein the receiver device comprises an indicator configured to notify, based on the indication signal, a user of the presence of the trigger object in the area surrounding the vehicle.

2. The method of claim 1 further comprising changing the threshold measurement based, at least in part, on the detection measurement.

3. The method of claim 1 where the motion detection sensor is powered by a battery and is retrofit on any portion of the vehicle, and wherein generating the detection identifier is based on data collected via the motion detection sensor and is independent of data collected by a second motion detection sensor.

4. The method of claim 1 where the trigger object in the area surrounding the vehicle is moving relative to the vehicle.

5. The method of claim 1 where the motion detection sensor uses the Doppler radar effect to measure a velocity of one or more of the false trigger object or the trigger object.

6. The method of claim 5 where the motion detection sensor has a field of view of 120 degrees or more.

7. The method of claim 5 where the motion detection sensor has a range of about eight feet.

8. The method of claim 1 where the indicator includes an audio circuit.

9. The method of claim 1 where the indicator includes a digital display circuit.

10. A system comprising
a wireless interface;
a memory; and
one or more processing circuits communicatively coupled to the memory, where the one or more processing circuits are configured to:
identify, via a wireless motion detection sensor retrofit to a vehicle, a first triggering event of the wireless motion detection sensor;
establish, in response to the first triggering event of the wireless motion detection sensor, a threshold measurement, where the threshold measurement is based on a first status of the wireless detection sensor and the first status of the wireless detection sensor relates to a characteristic of the wireless detection sensor over a period of time;
establish, in response to a second triggering event of the wireless motion detection sensor, a detection measurement, where the detection measurement is based on a second status of the wireless detection sensor, wherein one or more of establishing the threshold measurement or establishing the detection measurement comprises filtering a measurement of the wireless motion detection sensor for false trigger events based at least on at least a speed differential of the vehicle and a false trigger object associated with the false trigger event;
generate, by comparing the detection measurement to the threshold measurement, a detection identifier for indicating presence of a trigger object in an area surrounding a vehicle; and
transmit, via the wireless interface using a wireless transmission protocol and to a receiver device spaced from the wireless motion detection sensor, an indication signal, based at least in part on the detection identifier, wherein the receiver device comprises an indicator configured to notify, based on the indication signal, a user of the presence of the trigger object in the area surrounding the vehicle.

11. The system of claim 10 where the one or more processing circuits are further configured to change the threshold measurement based, at least in part, on the detection measurement.

12. The system of claim 10 where the motion detection sensor is powered by a battery and is retrofit on any portion of the vehicle, and wherein generating the detection identifier is based on data collected via the motion detection sensor and is independent of data collected by a second motion detection sensor.

13. The system of claim 10 where the trigger object in the area surrounding the vehicle is moving relative to the vehicle.

14. The system of claim 10 where the motion detection sensor uses the Doppler radar effect to measure a velocity of one or more of the false trigger object or the trigger event.

15. The system of claim 14 where the motion detection sensor has a field of view of 120 degrees or more.

16. The system of claim 14 where the motion detection sensor has a range of about eight feet.

17. The system of claim 10 where the indicator includes an audio circuit.

18. The system of claim 10 where the indicator includes a digital display circuit.

19. A computer program product disposed upon a non-transitory storage medium, the computer program product comprising computer program instructions that, when executed by a computer processor of a computer, cause the computer to identify, via a wireless motion detection sensor retrofit to a vehicle, a first triggering event of the wireless motion detection sensor; establish, in response to the first triggering event of the wireless motion detection sensor, a threshold measurement, where the threshold measurement is based on a first status of the wireless detection sensor and the first status of the wireless detection sensor relates to a characteristic of the wireless detection sensor over a period of time;

establish, in response to a second triggering event of the wireless motion detection sensor, a detection measurement, where the detection measurement is based on a second status of the wireless detection sensor, wherein one or more of establishing the threshold measurement or establishing the detection measurement comprises filtering a measurement of the wireless motion detection sensor for false trigger events based at least on at least a speed differential of the vehicle and a false trigger object associated with the false trigger event;

generate, by comparing the detection measurement to the threshold measurement, a detection identifier for indicating presence of a trigger object in an area surrounding a vehicle; and transmit using a wireless transmission protocol and to a receiver device spaced from the wireless motion detection sensor, an indication signal, based at least in part on the detection identifier, wherein the receiver device comprises an indicator configured to notify, based on the indication signal, a user of the presence of the trigger object in the area surrounding the vehicle.

* * * * *